United States Patent
Kong

[19]

[11] Patent Number: 6,125,882

[45] Date of Patent: Oct. 3, 2000

[54] FLUID TRANSFER SYSTEM

[76] Inventor: Carl Cheung Tung Kong, 6122 Whittier Blvd., Los Angeles, Calif. 90022

[21] Appl. No.: 09/212,767

[22] Filed: Dec. 16, 1998

[51] Int. Cl.[7] .................................................. B64D 37/00
[52] U.S. Cl. ........................ 137/558; 137/213; 137/572; 137/899.2; 251/7; 244/135 C
[58] Field of Search ................................ 137/899.2, 571, 137/572, 576, 213, 558; 244/135 R, 135 C; 251/7

[56] References Cited

U.S. PATENT DOCUMENTS

| | | | |
|---|---|---|---|
| 940,202 | 11/1909 | Setzer | 137/213 |
| 2,355,084 | 8/1944 | Kurrle . | |
| 2,356,786 | 8/1944 | Harman . | |
| 2,373,221 | 4/1945 | Blaylock . | |
| 2,552,119 | 5/1951 | Scharenberg . | |
| 2,575,923 | 11/1951 | McMahan . | |
| 2,777,656 | 1/1957 | Clifton . | |
| 3,084,825 | 4/1963 | Hultquist . | |
| 3,101,921 | 8/1963 | Price . | |
| 3,605,667 | 9/1971 | Wilks et al. . | |
| 3,693,915 | 9/1972 | Ulanovsky . | |
| 3,876,121 | 4/1975 | Preikschat | 222/503 |
| 4,142,415 | 3/1979 | Jung et al. . | |
| 4,214,721 | 7/1980 | Burhans et al. . | |
| 4,229,798 | 10/1980 | Rosie et al. . | |
| 4,296,472 | 10/1981 | Sarksi . | |
| 4,487,066 | 12/1984 | Pardi et al. . | |
| 4,715,417 | 12/1987 | Coloney . | |
| 4,948,070 | 8/1990 | Lyman . | |
| 5,116,000 | 5/1992 | Girard . | |
| 5,263,329 | 11/1993 | Grove et al. . | |
| 5,279,323 | 1/1994 | Grove et al. . | |
| 5,301,510 | 4/1994 | Glasser . | |
| 5,479,959 | 1/1996 | Stolemyer et al. . | |
| 5,513,527 | 5/1996 | Griffiths . | |
| 5,582,366 | 12/1996 | Hamant . | |
| 5,660,358 | 8/1997 | Grafwallner et al. | 244/135 R |

FOREIGN PATENT DOCUMENTS

| | | | |
|---|---|---|---|
| 3115504 | 2/1982 | Germany | 137/552 |
| 932736 | 7/1963 | United Kingdom | 251/7 |

*Primary Examiner*—A. Michael Chambers
*Attorney, Agent, or Firm*—Kelly Bauersfeld Lowry & Kelly, LLP

[57] ABSTRACT

A variable volume fluid storage tank or reservoir and related fluid transfer system are provided for storing and transferring volatile or hazardous fluids, particularly such as fuel in an aircraft fuel supply system. Each fluid storage tank comprises a tank body in combination with a movable base wall defining a variable volume internal chamber for receiving and storing fluid. Each storage tank further includes a dispense port for dispensing the fluid, e.g., to a manifold or the like for supply to one or more aircraft engines, with the base wall moving relative to the tank body during fluid dispensing to substantially preclude any residual air or vapor space within the storage tank. A fluid level sensor unit mounted outside the tank chamber tracks displacement of the base wall to provide an indication of the fluid volume remaining within the storage tank. Multiple storage tanks may be ganged together and the fluid contained therein transferred quickly and safely between the tanks in a variety of fluid handling and fluid transfer applications. In one form, multiple storage tanks may be configured for nesting together in a progressively reduced profile as fluid is dispensed therefrom.

28 Claims, 11 Drawing Sheets

FLUID TRANSFER SYSTEM

BACKGROUND OF THE INVENTION

This invention relates generally to devices and systems for storing and transferring volatile and/or potentially hazardous fluids, particularly such as aircraft fuel in a fuel delivery system for an aircraft. More specifically, this invention relates to an improved variable volume storage tank or reservoir for storing and dispensing a selected fluid such as aircraft fuel or the like, wherein the storage tank substantially precludes the formation of a residual air space or vapor space within the storage tank as fuel is dispensed therefrom, and further wherein the storage tank is provided with externally mounted fluid level sensor means for monitoring the level or volume of fuel remaining within the tank. The variable volume storage tank may be utilized in a variety of fluid transfer applications, such as transfer of potentially hazardous fluids, or transfer of fluids in an outer space environment.

Modern aircraft are commonly equipped with multiple fuel tanks mounted at different positions along the aircraft fuselage and wings, wherein such multiple fuel tanks are designed to carry a substantial quantity of fuel and thereby provide the aircraft with a significant potential range of flight. The fuel tanks are normally interconnected with each other to accommodate inter-tank fuel transfer and thereby permit substantially uniform or balanced distribution of the fuel load throughout the aircraft, particularly as the fuel is depleted during flight operations by delivery to one or more aircraft engines. Moreover, for relatively short range flights, it is common for the aircraft to take off with only a partial fuel load, sometimes with one or more of the fuel tanks in an empty condition in order to reduce overall aircraft weight and thereby improve fuel efficiency. Internal fuel transfer pumps are commonly mounted within the various fuel tanks and can be operated on the ground or in-flight to transfer fuel from one tank to another, or to empty one or more fuel tanks preparatory to short range flight operations. In addition, aircraft fuel tanks are normally equipped with fuel level sensors mounted inside the various tanks to provide the flight crew with an indication of the remaining fuel volume in each tank. of a sensor unit mounted outside the tank. The variable volume fluid storage tank of the present invention is adapted for use in an interconnected multiple tank system for safe and efficient delivery of fuel to aircraft engines or the like, and also for safe and efficient transfer from one tank to another. The storage tank is also adapted for safe and efficient transfer of fluid in a controlled manner from one location to another in a variety of different fluid handling environments.

In one preferred form, the improved fluid storage tank or reservoir comprises a tank body having an outlet or dispense port at one end and a movable base wall mounted on the tank body generally at an opposite end thereof by a flexible bellows like membrane. The tank body cooperates with the movable base wall to define a variable volume internal chamber for receiving and storing a fluid such as fuel or the like. As fuel is delivered from the storage tank, the base wall displaces progressively into the tank body to substantially preclude the presence of an air or vapor space within the internal chamber. The fluid level sensor unit includes means mounted outside the internal chamber for tracking the displacement of the base wall to provide an indication of the fluid level or volume remaining within the tank.

A plurality of fluid storage tanks of the present invention may be ganged together in a multiple tank system, such as in an aircraft fuel supply system, with each storage tank including at least one transfer port to permit fluid transfer between tanks. During normal operation, fuel can be delivered proportionally from each storage tank in the system to one or more aircraft engines, with the movable base wall within each tank following the fuel level therein to substantially preclude any air or vapor space within which volatile fuel vapors might otherwise collect. In the event of malfunction within one of multiple aircraft engines and related shut-off of fuel supply thereto, fuel will continue to be delivered proportionally from the multiple storage tanks in the system to the remaining operational engines. In the event of damage to one of the storage tanks, residual fuel therein can be transferred safely and efficiently to an auxiliary standby tank or to another storage tank in the system by appropriate advancement of the base wall within the damaged tank and a corresponding retraction of the base wall within one or more tanks into which In recent years, a number of aircraft accidents have been attributed to malfunctions associated with fuel tanks and related systems for delivering fuel to the aircraft engines. More specifically, aircraft fuel tanks are normally provided in a fixed volume configuration for containing a specified maximum quantity of fuel in a substantially filled condition. As the fuel is transferred from a tank in the course of fuel usage or as a result of fuel transfer to another tank, a substantial air or vapor space is created within the tank above any fuel remaining therein. This air or vapor space undesirably provides a site for the formation and accumulation of volatile fuel vapors in a high concentration. This accumulation of fuel in vapor form not only wastes fuel and represents a source of air pollution, but also presents a safety hazard in the presence of air and any source of ignition. One potential ignition source comprises the electrically powered and/or friction generating fuel transfer pumps mounted directly within the aircraft fuel tanks. Another potential ignition source comprises other electrically powered devices such as fuel level sensors mounted directly within the fuel tanks.

The present invention seeks to overcome these problems and disadvantages, by providing an improved fuel storage tank or reservoir of variable volume design to substantially eliminate residual air or vapor space when the tank is in an empty or partially empty condition, and further wherein the fuel level within the storage tank is monitored by an externally mounted fuel sensor. The improved variable volume tank of the present invention can be ganged together in a multiple tank system, in an aircraft or other fluid transfer environment, to provide safe and efficient fluid transfer from one location to another.

SUMMARY OF THE INVENTION

In accordance with the invention, an improved fluid storage tank or reservoir is provided, wherein the storage tank is particularly suited for safe and efficient fluid transfer such as in an aircraft fuel supply system or the like. The improved storage tank has a variable volume construction with substantially no residual air or vapor space as fluid is delivered therefrom, and further wherein the storage tank is adapted for fluid level monitoring by means the fuel is to be transferred. Such fuel transfer is accomplished without introducing any significant air or vapor space in the system.

In one preferred multiple tank system arrangement, the plurality of storage tanks comprise a series of storage tanks mounted end-to-end and adapted for nested reception one within the other as the fluid supply therein is depleted. For example, in an aircraft fuel supply system, a first storage tank has the dispense port thereof coupled to a fuel manifold or the like for delivery of fuel to aircraft engines. A second storage tank of smaller size has the dispense port thereof coupled to the movable base wall of the first storage tank for delivery of the fuel therein to said first storage tank. A third and subsequent storage tanks of progressively smaller size may be coupled respectively in a similar serial manner to the movable base walls of the second and subsequent storage tanks. As fuel is depleted, the second and subsequent storage tanks will track the displacement of the base walls to which they are mounted, resulting in nesting of the storage tanks within each other.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 6 is a schematic diagram illustrating use of multiple storage reservoirs of the type shown in FIGS. 1–5, arranged in a system for fueling a pair of aircraft engines or the like;

FIG. 8 is a schematic diagram similar to FIG. 6, but showing use of multiple storage reservoirs of the type shown in FIGS. 1–5, arranged in a system for fueling four aircraft engines or the like;

FIG. 16 illustrates a pair of variable volume fluid storage tanks or reservoirs of the type shown in FIGS. 1–5, shown in vertical section, and illustrating transfer of fluid from one storage reservoir to the other, and employed for use in controlled docking of space vehicles or the like.

DETAILED DESCRIPTION OF THE PREFERRED EMBODIMENTS

As shown in the exemplary drawings, an improved storage tank or reservoir referred to generally by the reference numeral 10 is provided for storing and handling a fluid 12, such as fuel or the like in an aircraft or motor vehicle fuel supply system. The fluid storage tank 10 defines a variable volume chamber 14 from which the selected fluid 12 can be dispensed, substantially without creation of any residual air or vapor space. Moreover, a fluid level sensor unit 16 is provided for indicating the volume of fluid remaining within the storage tank 10, wherein the sensor unit 16 is mounted outside the fluid-containing chamber 14 and is thus isolated from direct contact with the fluid 12. A plurality of storage tanks 10 constructed in accordance with the invention may be ganged together in a fluid supply system, such as a fuel supply system for an aircraft or the like. Alternately, the storage tank 10 may be utilized in a variety of fluid handling applications for safe and efficient transfer of potentially hazardous materials.

Figure 1:
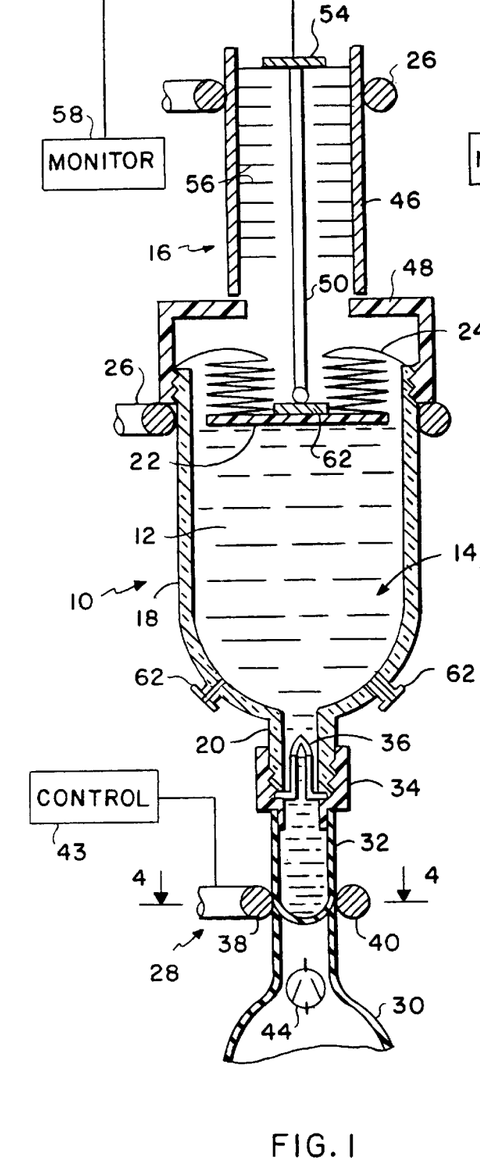
FIG. 1 is a fragmented vertical sectional view illustrating a variable volume storage tank or reservoir constructed in accordance with the novel features of the invention.
Figure 2:
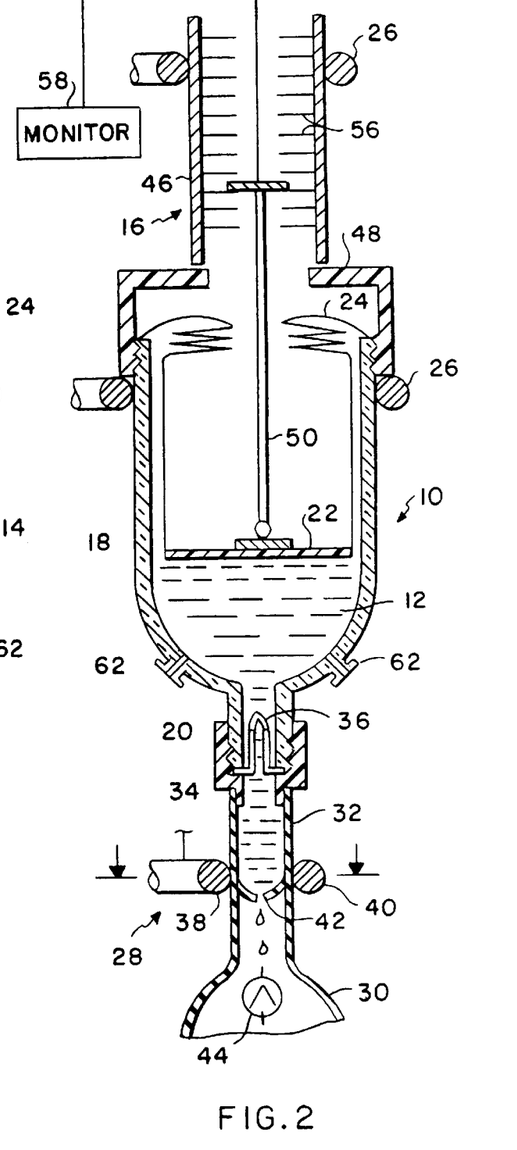
FIG. 2 is a fragmented vertical sectional view of the storage reservoir of FIG. 1, depicting dispensing of a fluid such as fuel therefrom.

As shown in FIGS. 1–5 in accordance with one preferred form of the invention, the fluid storage tank or reservoir 10 comprises a relatively rigid hollow tank body 18 of selected physical size and shape, and having an open outlet or dispense port 20 formed at a lower end thereof. An upper end of the tank body 18 is open for sliding reception of a base wall 22 having a cross sectional shape for relatively close sliding conformance with the cross sectional geometry of the tank body 18. The base wall 22 is coupled generally at its periphery to a flexible bellows like annular membrane 24 which is in turn secured to the tank body 18 at or near the upper end thereof. With this construction, the base wall 22 comprises a movable wall which cooperates with the tank body 18 to define the variable volume chamber 14 within which the fluid 12 is contained. FIG. 1 shows the base wall 22 in a substantially retracted position with the storage tank 10 in a substantially filled condition, whereas FIG. 2 shows the base wall 22 in a partially advanced position with the storage tank 10 in a partially emptied condition. The storage tank 10 may be mounted on a suitable frame 26, such as a frame for supporting the tank within or on an aircraft in a fuel system environment or the like.

Figure 3:
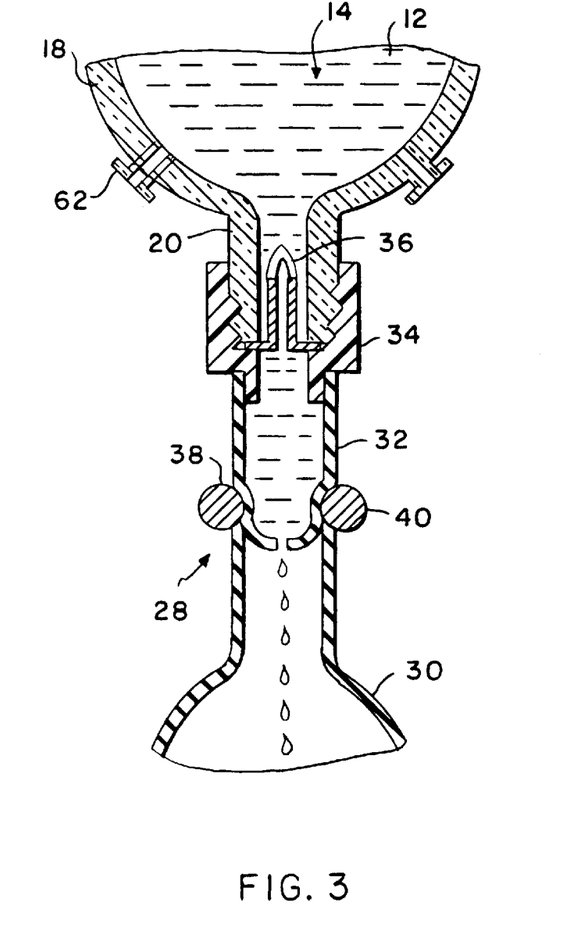
FIG. 3 is an enlarged and fragmented vertical sectional view of a portion of the storage reservoir of FIG. 2, showing operation of a flow rate controller to regulate fluid dispensing from the reservoir.
Figure 4:
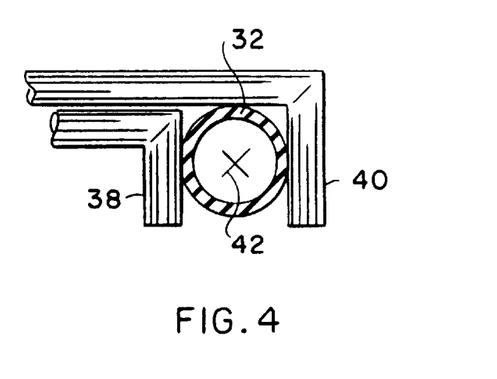
FIG. 4 is an enlarged and fragmented horizontal sectional view taken generally on the line 4—4 of FIG. 1.
Figure 5:
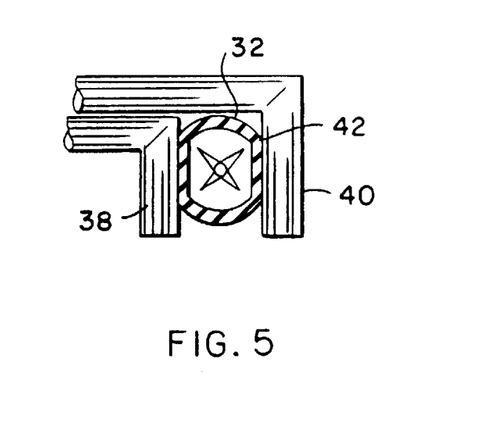
FIG. 5 is an enlarged and fragmented horizontal sectional view taken generally on the line 5—5 of FIG. 2.

The fluid 12 is delivered through the dispense port 20 in a controlled manner for use. More particularly, FIGS. 1–3 illustrate one form of a flow rate controller 28 coupled to the dispense port 20 for regulating delivery of fluid 12 such as liquid fuel to a fuel manifold 30 via which the fuel is delivered to one or more aircraft engines (not shown) in an aircraft fuel supply system application. The illustrative flow rate controller 28 comprises a ported resilient nipple 32 attached to the tank body 18 at the dispense port 20 by means of a cap fitting 34 or the like, preferably to include a suitable fuel filter 36 seated within the dispense port 20. Fluid flow through the nipple 32 may be regulated by a clamp having movably adjusted jaws 38 and 40 engaging the nipple on opposite sides thereof slightly above or upstream from a nipple port 42 which may have a generally X-shaped slit configuration as viewed in FIGS. 4 and 5. A control block 43 (FIG. 1) is provided for adjustably setting the clamp jaws 38, 40 to partially compress or squeeze the nipple 32 to enlarge the open flow area defined by the nipple port 42, as shown by way of example in FIGS. 2, 3 and 5, or to allow the nipple 32 to return to a substantially undeformed state with the port 42 closed as viewed in FIGS. 1 and 4. Alternately, the clamp jaws 38, 40 may be displaced toward each other sufficiently to tightly clamp and positively close the nipple 32 to fluid flow therethrough. When the nipple port 42 is open, fluid dispensing from the tank 10 may proceed by gravity flow, or with the assistance of one or more fuel pumps 44 as would typically be provided in an aircraft fuel system, or by means of a venturi-type fluid pressure differential to create suction on fluid within the tank 10. Alternative fluid flow regulator devices for providing a variably set outflow orifice may also be used, such as a pair of adjustably set overlying flow ports of the type shown and described in U.S. Ser. No. 09/129,715, filed Aug. 5, 1998, and incorporated by reference herein.

The rate of fluid flow from the storage tank 10 is monitored by the fluid level sensor unit 16. FIGS. 1 and 2 show the sensor unit 16 to include a sensor housing 46 mounted at the upper end of the tank body 18 by means of a mounting collar 48 or the like. The sensor housing 46 encases a sensor track arm 50 which is movably carried for displacement in response to changes in the level of the fluid 12 withing the tank chamber 14.

More specifically, the sensor track arm 50 comprises a vertically oriented element having a lower end coupled by a weighted slug 52 or the like adapted to rest upon and preferably connected to an upper outboard face of the movable base wall 22. As shown in FIG. 1 with the tank 10 in a substantially filled condition, the sensor track arm 50 extends upwardly within the sensor housing 46 to terminate at an upper end positioned at or near the upper end of the housing 46. However, as fluid is dispensed from the tank 10, the sensor arm 50 descends in a manner following or tracking the base wall 22, whereby the upper end of the sensor arm 50 also translates downwardly within the sensor housing 46. Importantly, the upper end of the sensor arm 50 carries a conductive contact 54 past a vertically spaced succession of conductive pads 56 on the sensor housing 46, resulting in a succession of electrical signals which can be detected by a monitor 58. The monitor 58 may be programmed to translate this movement of the sensor arm 50 to determine and indicate the remaining fluid volume within the storage tank 10.

In addition, the sensor track arm 50 is desirably linked to the monitor 58 or other suitable mechanical actuator device for positively advancing or retracting the sensor arm 50 relative to the associated fluid storage tank 10. Advancing displacement of the track arm 50 causes the movable base wall 22 to advance or descend into the tank body 18, with the result that the fluid contained within the chamber 14 is positively displaced or transferred from the tank to another location via the dispense port 20 or through one or more fluid transfer ports 62 formed on the tank body 18 at locations generally adjacent to the dispense port 20. Conversely, retraction movement of the track arm 50 causes the movable wall 22 to retract or move upwardly within the tank body 18 to draw additional fluid from another location via the dispense port 20 or through one or more transfer ports 62 into the tank chamber 14. Importantly, during such fluid transfer from or to the associated storage tank 10, the liquid is displaced substantially without creation of any air or vapor space within the tank chamber 14. Moreover, if desired, portions of the storage tank exterior such as the sensor unit 16 may include inert or relatively fireproof materials or coatings to further reduce the risk of fire.

Of course other types of sensors may be utilized, such as ultrasonic level transmitters.

Figure 6:
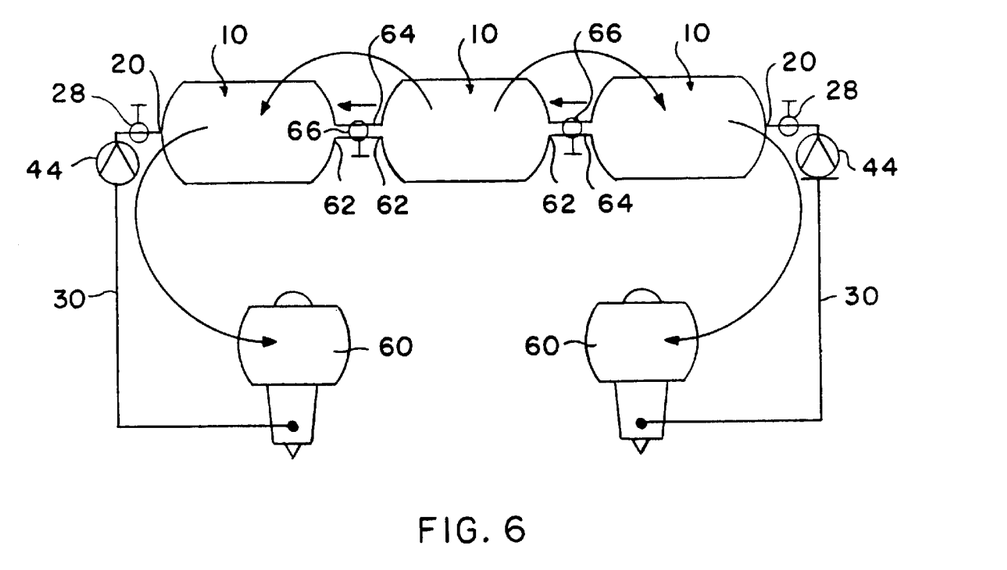
Figure 7:
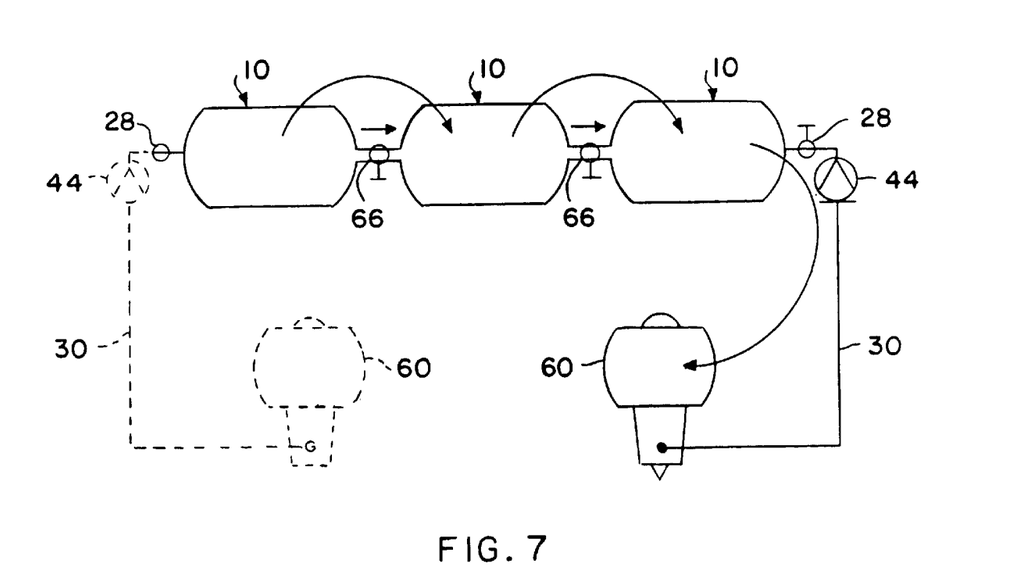
FIG. 7 is a schematic diagram similar to FIG. 6, but illustrating operation of the multiple fuel storage reservoirs in the event of malfunction by one of the aircraft engines.

FIGS. 6 and 7 illustrate multiple storage tanks 10 of the type shown and described in FIGS. 1–5, utilized in a system arrangement for supplying fuel to a pair of engines 60 in a aircraft. For such system arrangement, the multiple tanks 10 are conveniently interconnected to each other by means of the transfer ports 62 positioned adjacent the associated dispense port 20 near the lower end of each tank body 18, as viewed in FIGS. 1–3. These transfer ports 62 are normally closed and sealed yet permit quick-connect interconnection of multiple storage tanks 10, three of which are shown in the exemplary embodiment of FIGS. 6 and 7. Specifically, the three storage tanks 10 are interconnected in-line, with one tank mounted centrally between the other two tanks and flow coupled therewith by means of fluid transfer lines 64 coupled between the associated transfer ports 62. These fluid transfer lines 64 may comprise resilient tubing with clamp-type control valves 66 mounted thereon, constructed as shown and described in FIGS. 3–5, for selectively closing the associated fluid transfer line 64 on an as-needed basis. Alternately, other fluid conduit materials and other types of control valves may be used such as the flow rate controller 28.

The outboard pair of the fuel storage tanks 10 shown in FIGS. 6 and 7 have their respective dispense ports 20 coupled to a corresponding pair of fuel manifolds 30 each shown to include a fuel pump 44. During normal operation, all three of the interconnected fuel storage tanks 10 deliver fuel to the engines 60. That is, the fuel storage tanks 10 are open for fuel flow therebetween, and thereby essentially comprise a common fuel reservoir for supplying the engines 60. In each tank 10, as fuel is dispensed therefrom, the associated base wall 22 descends within the tank body 18 to maintain the absence of any significant air or vapor space above the residual volume of fuel. As a result, there is virtually no opportunity for any significant amount of potentially explosive fuel vapor to be present. In addition, the sensor unit 16 associated with each of the multiple tanks 10 provides a current indication of the unused volume of fuel, without requiring portion of the sensor unit 16 to be mounted directly within the fuel-containing chamber 14. With this construction, potential for a catastrophic fire or explosion attributable to accumulated fuel vapors and/or the presence of electrical components as a source of ignition within the fuel chamber 14 are substantially avoided.

In the event of system malfunction, such as an engine failure or a fuel pump failure, the storage tanks 10 of the present invention continue to function as a common fuel reservoir for all remaining operational engines 60 of the aircraft. As shown in FIG. 7, a failed engine 60 and/or a failed fuel pump 44 are shown in dotted lines. In this event, fuel supply to the failed engine 60, or from the failed pump 44, is normally terminated simply by de-energizing the selected fuel pump 44. Alternately, if desired, such fuel supply can be terminated by actuating the associated flow rate controller 28 to positively halt fuel flow through the dispense port 22 of the tank 10 connected to the inoperative pump or engine. Thereafter, the transfer ports 62 and related transfer lines 64 interconnect the array of storage tanks 10 to permit unrestricted fuel flow through the series of tanks and further to the manifold 30 for supply to operational engines.

Figure 8:
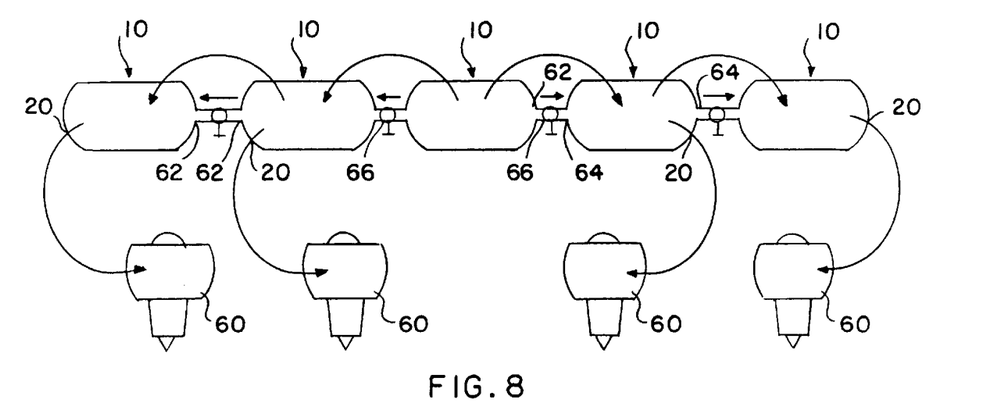

FIG. 8 depicts a further variation of the system concept shown in FIGS. 6 and 7, wherein a series-connected plurality of five storage tanks 10 are interconnected via fuel transfer ports 62 and related transfer lines 64, in a fuel system for supplying four aircraft engines 60. In this embodiment, in the event of a malfunction of any one of the aircraft engines 60, or of any one of the fuel pumps for delivering fuel to each engine, cessation of fuel delivery to the failed component results in the array of tanks 10 thereafter providing a common fuel reservoir to supplying fuel to all remaining operational engines.

Figure 9:
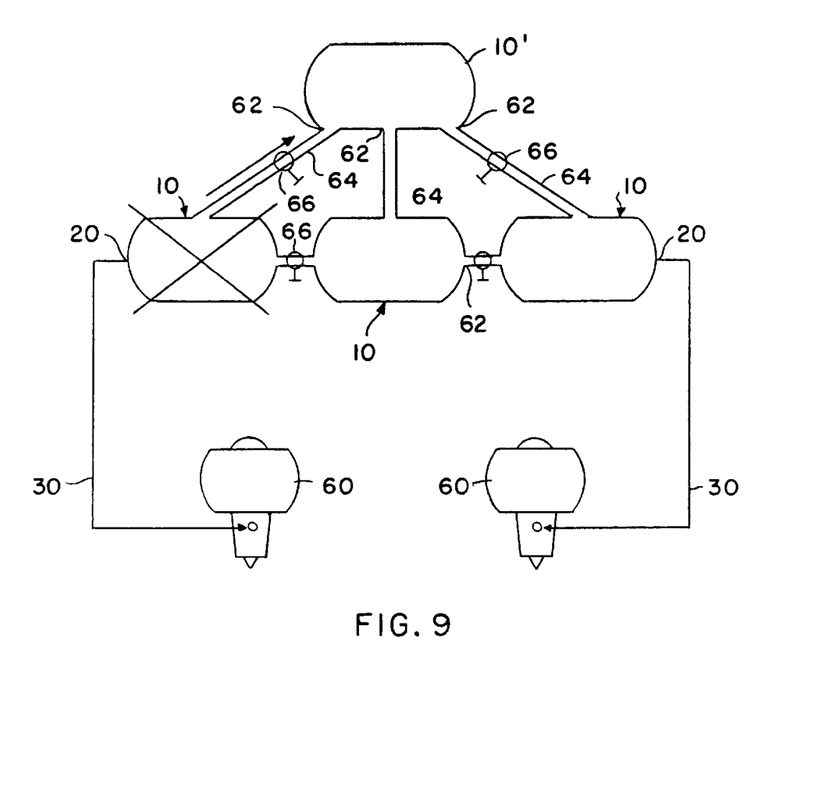
FIG. 9 is a schematic diagram similar to FIG. 6, depicting multiple storage reservoirs of the type shown in FIGS. 1–5 arranged in a system for fueling a pair of aircraft engines or the like, and further including an auxiliary or standby fuel storage reservoir.

FIG. 9 depicts another system variation, showing an auxiliary or standby fuel storage tank 10' which conforms in construction and operation to the tank 10 shown and described above. As shown, the standby tank 10' is coupled via a plurality of transfer ports 62 and associated transfer lines 64 to each of a plurality of primary tanks 10, three of which are shown in accordance with the system configuration of FIGS. 6–7. In the event of failure of or damage to one of the primary tanks 10, the control valves 66 mounted along the respective transfer lines 64 can be appropriately closed to disconnect the damaged tank from adjacent primary tanks, and to connect the damaged tank to the standby tank 10'. Appropriate retraction of the sensor arm 50 and associated base wall 22 within the standby tank 10', which is desirably accompanied by advancement of the sensor arm 50 and associated base wall 22 within the damaged primary tank 10, is effective to quickly and efficiently transfer the remaining fuel from the damaged primary tank 10 to the standby tank 10'. As soon as this fuel transfer is completed, the control valve 66 mounted along the transfer line 64 interconnecting the standby tank 10' with the damaged primary tank 10 can be closed, thereby isolating the damaged tank from the remainder of the fuel supply system. While such isolation of the damaged primary tank 10 may result in failure of one aircraft engine 60, the standby tank 10' and the remaining primary tanks 10 provide a common fuel reservoir for continued supply of fuel to all remaining operational engines on the aircraft.

Figure 10:
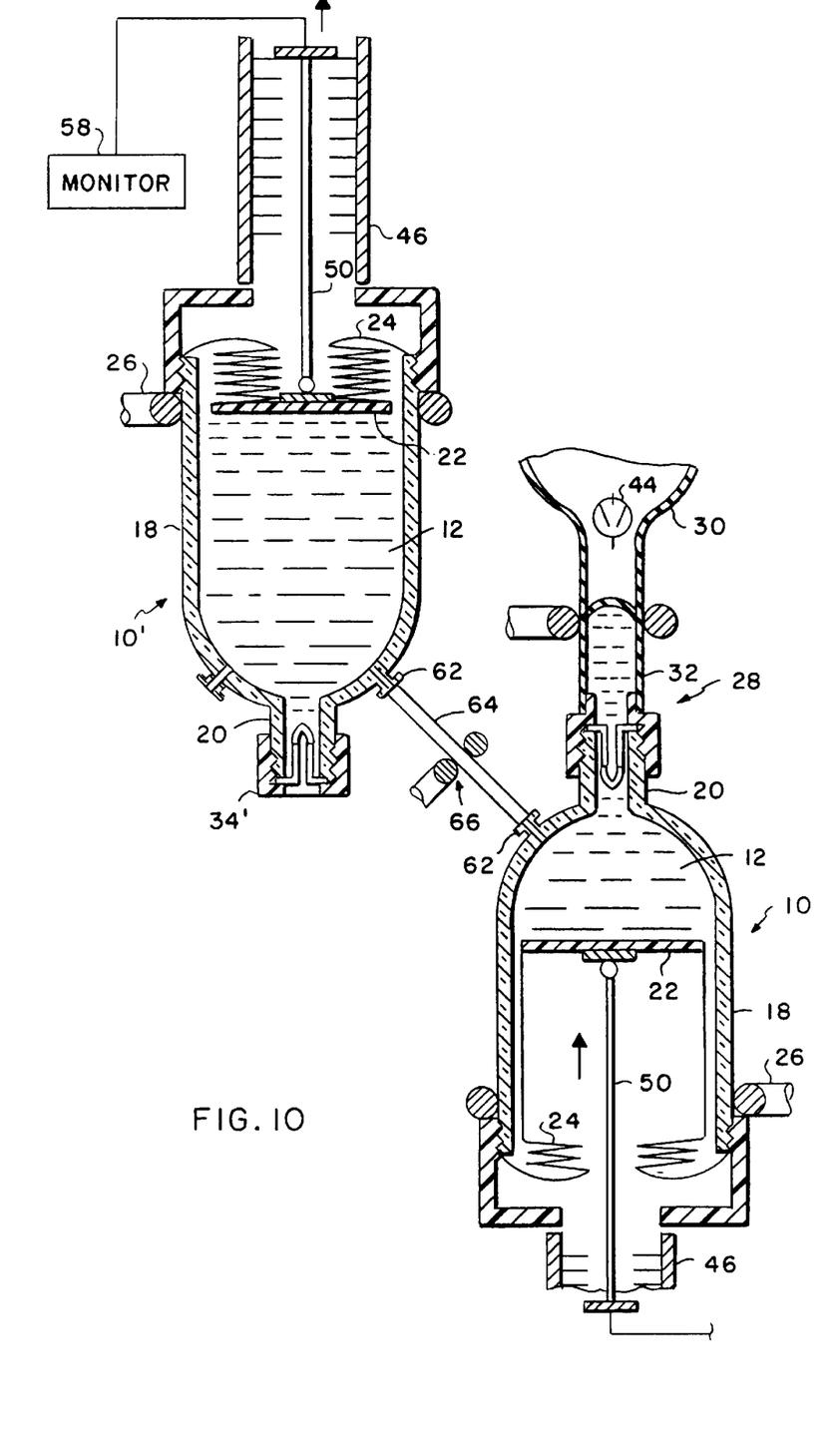
FIG. 10 illustrates a pair of variable volume fluid storage tanks or reservoirs of the type shown in FIGS. 1–5, shown in vertical section, and illustrating transfer of fluid from one storage reservoir to the other.

Fluid transfer between a standby storage tank 10' and a primary storage tank 10 is shown in more detail in FIG. 10, wherein it will be recognized and appreciated that such fluid transfer may occur in an aircraft fuel supply system of the type shown and described in FIG. 9, or in any other fluid transfer application particularly such as those involving potentially hazardous liquid agents. As shown, a primary storage tank 10 is partially filled with fluid 12 and may be coupled via a flow rate controller 28 of the type previously described for delivering the fluid 12 at a regulated flow rate to a fuel manifold 30 or other selected site. A transfer line 64 including a clamp type control valve 66 interconnects the primary tank 10 with the auxiliary or standby tank 10' by suitable coupling between transfer ports 62 on the pair of storage tanks. The dispense port 20 of the standby tank 10' is shown closed by a cap fitting 34'. The sensor arm 50 coupled to the base wall 22 of the standby tank 10' can be retracted under the control of the monitor 58, and the sensor arm 50 coupled to the base wall 22 of the primary tank 10 can be advanced under the control of the monitor to deliver the fluid 12 quickly and easily from the primary tank 10 into the standby tank 10'. As soon as the fluid delivery is completed, the control valve 66 may be closed and/or the transfer line 64 may be disconnected from the two tanks. Importantly, the fluid transfer occurs with the fluid passing as an uninterrupted or solid stream, substantially in the absence of any gaps or voids within which volatile vapors can accumulate. Transfer of the fluid without creates gaps or voids can be especially desirable when handling certain hazardous fuels and the like, e.g., transferring highly volatile fuels such as hydrazine in a spacecraft environment. Moreover, fluid transfer in this manner may take place irrespective of the orientation of the two storage tanks and/or the presence gravity, whereby such fluid transfer may occur quickly and easily in an outer space environment.

Figure 11:
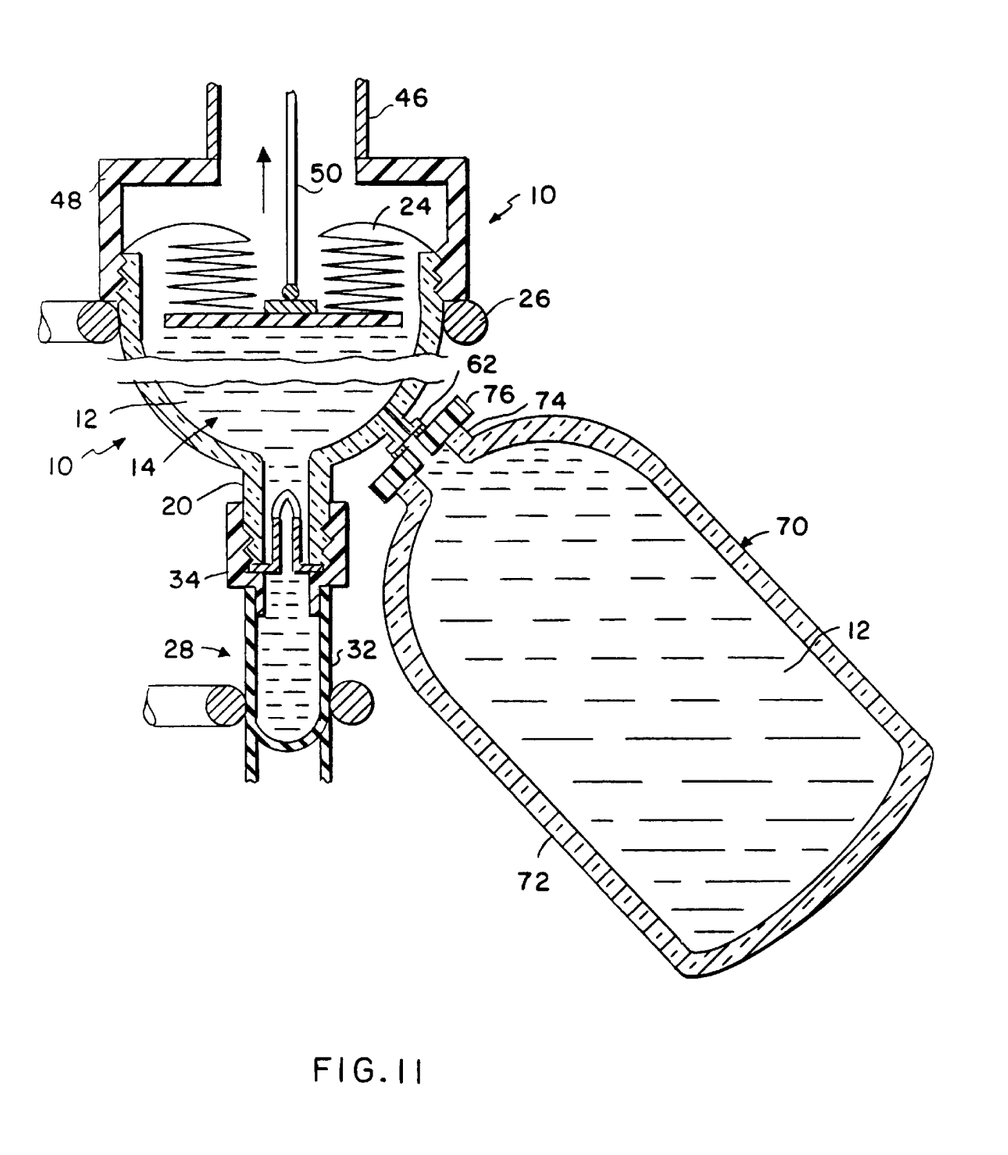
FIG. 11 depicts transfer of fluid from a collapsible and disposable supply container to a variable volume fluid storage tank or reservoir formed in accordance with the invention.
Figure 12:
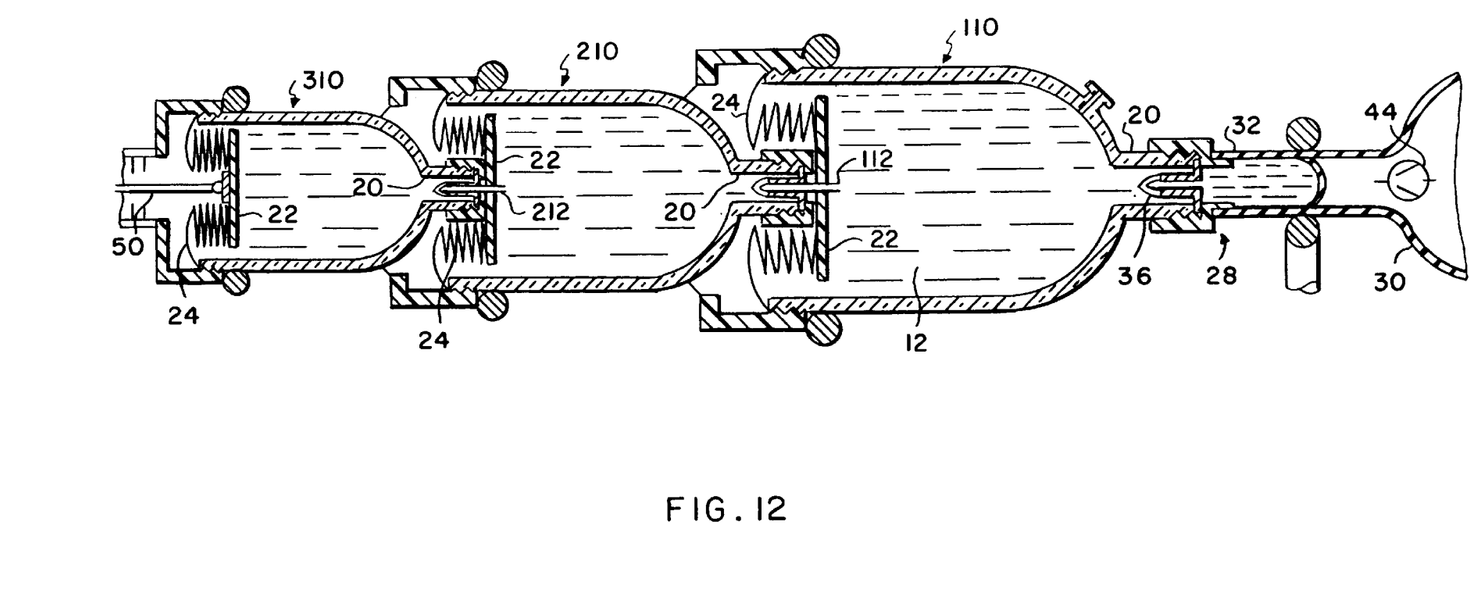
FIG. 12 shows a plurality of variable volume fluid storage tanks or reservoirs of the type shown in FIGS. 1–5, provided in different sizes and interconnected to accommodate space efficient nesting of the storage reservoirs as fluid is dispensed therefrom.
Figure 13:
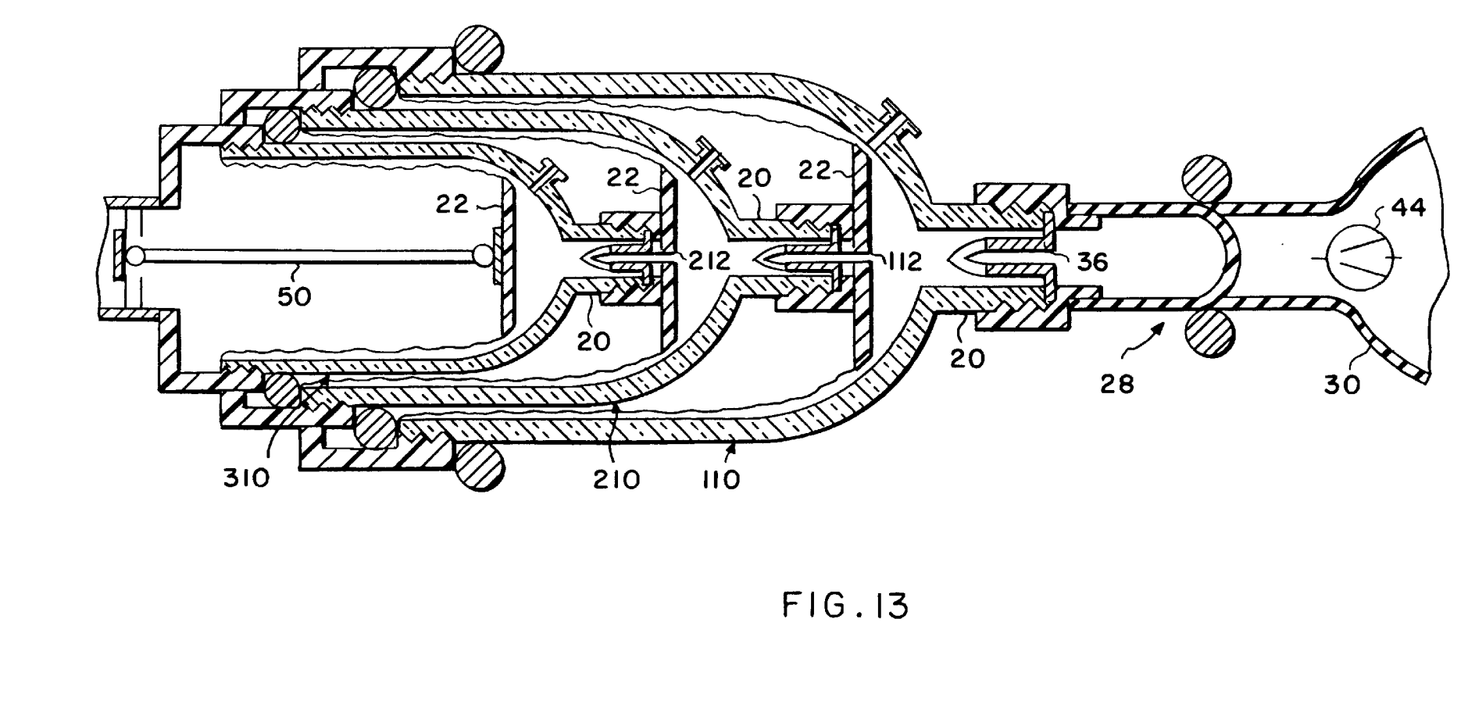
FIG. 13 shows the multiple storage reservoirs of FIG. 12 in a substantially nested configuration.
Figure 14:
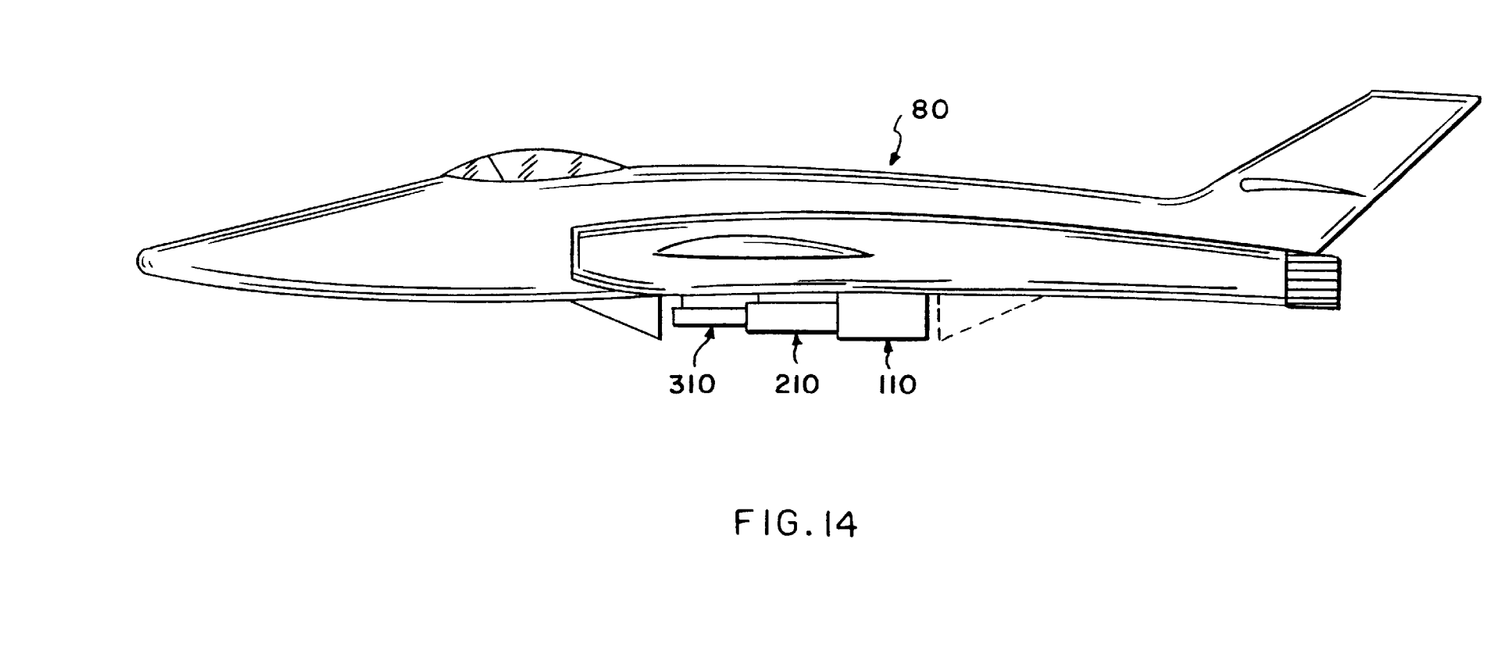
FIG. 14 illustrates a military jet aircraft equipped with nestable variable volume fuel tanks of the type shown in FIGS. 12 and 13.

A related fluid transfer application using the improved storage tank 10 of the present invention is shown in FIG. 11, wherein the storage tank 10 is adapted to be filled or refilled from a collapsible and typically disposable supply container 70. The supply container 70 is filled with a selected fluid such as fuel or other potentially hazardous material, and comprises a resilient collapsible container body 72 with an open-mouthed neck 74 having a normally closed cap 76 mounted thereon. The cap 76 is designed for quick and easy coupling to a transfer port 62 on the storage tank 10, directly as viewed in FIG. 11 or indirectly by means of a transfer conduit 64 of the type previously shown and described. When the cap 76 is coupled to the transfer port 62, the fluid 12 within the collapsible container 70 is free to flow into the variable volume chamber 14 of the storage tank 10. In a preferred transfer procedure, fluid flow from the supply container 70 to the tank 10 is facilitated by retracting the sensor arm 50 and associated base wall 22 of the tank 10 to draw the fluid 12 into the chamber 14. Such fluid transfer may occur in any orientation and without regard to gravity, whereby the transfer procedure may take place on the ground, or on an aircraft during flight operations, or on a spacecraft in an outer space environment. When the fluid transfer is complete, the collapsible supply container 70 may be disconnected from the tank 10 and appropriately discarded. Alternately, it will be understood that the fluid transfer may proceed in reverse, namely, to transfer fluid 12 from the tank 10 to the supply container 70, if desired, FIGS. 12–14 show a system configuration utilizing a plurality of storage tanks constructed in accordance with the present invention to form a fuel tank system for an aircraft 80 (FIG. 14), wherein the multiple tanks are adapted to nest together in a substantially reduced profile geometry as fuel is dispensed therefrom. More particularly, as shown in FIGS. 12 and 13, a first storage tank 110 of relatively large size has the dispense port 20 thereof coupled via a flow rate controller 28 or the like to a suitable fuel manifold 30 to supply fuel to an aircraft engine (not shown) or the like, all as previously shown and described herein. The movable base wall 22 of the first tank 110 has an inflow port 112 formed therein, and is coupled to a second smaller storage tank 210 for fuel flow through the dispense port 20 of the smaller tank into the larger storage tank 110. The movable base wall 22 of the second tank 210 also has an inflow port 212 formed therein, and is coupled to a third progressively smaller storage tank 310 for fuel flow through the dispense port thereof into the second tank 210. A selected number of such progressively smaller storage tanks can be assembled in series relation in this manner, with three tanks 110, 210 and 310 being depicted in FIGS. 12–13, wherein the final tank in the series includes an unported base wall 22 having a sensor arm 50 of a fluid level sensor unit attached thereto.

FIG. 12 shows the progression of storage tanks 110, 210 and 310 in a substantially filled condition and oriented in an elongated end-to-end geometry. As fuel is dispensed from the series-connected tanks, the movable base walls therein each advance into the associated fuel-containing chamber 14 to reduce the volumetric size thereof, and additionally to cause the tanks to progressively nest one within the other. FIG. 13 illustrates the series of tanks 110, 210 and 310 in a substantially empty and substantially nested configuration. Suitable guide means (not shown) such as a guide rail or the like supporting the individual tanks for linear sliding motion may be provided. FIG. 14 depicts the series of fuel tanks in an extended and substantially filled condition suspended from the underside of the aircraft 80.

Figure 15:
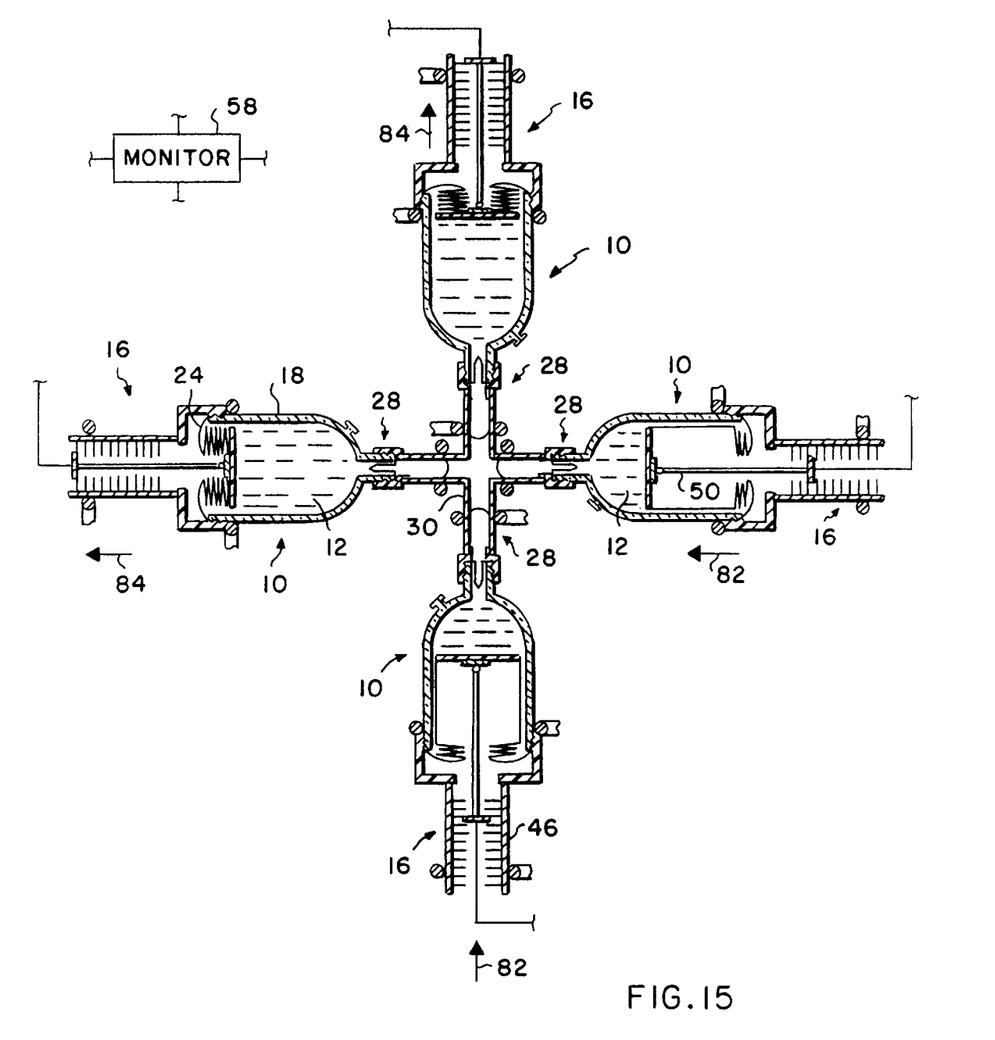
FIG. 15 shows a network of variable volume fluid storage tanks or reservoirs formed in accordance with the invention, and interconnected to a common dispense line.

A plurality of four storage tanks 10 constructed in accordance with the invention are shown in FIG. 15 coupled to a common supply manifold 30. Each storage tank 10 is designed for delivering a selected fluid at a controlled rate of flow via a flow rate controller 28 or the like to the common manifold 30, with individual fluid level sensor units 16 on the tanks 10 being coupled to a monitor 58 for monitoring and indicating the fluid level within each tank. In the event of damage to or malfunction in one or more of the tanks 10, the remaining fluid therein may be transferred quickly and easily to one or more of the remaining tanks by appropriate advancement and retraction of the tank base walls 22. More specifically, as viewed in FIG. 15, remaining fluid can be expelled from a pair of the tanks 10 by appropriate advancement of the sensor arms 50 and associated base walls 22 therein, as indicated by reference arrows 82, and drawn into the other pair of the tanks by appropriate retraction of the sensor arms 50 and associated base walls 22 therein, as indicated by reference arrows 84. Once again, this transfer may occur irrespective of tank orientation and gravitational fields, whereby the system is fully functional in an outer space environment.

Figure 16:
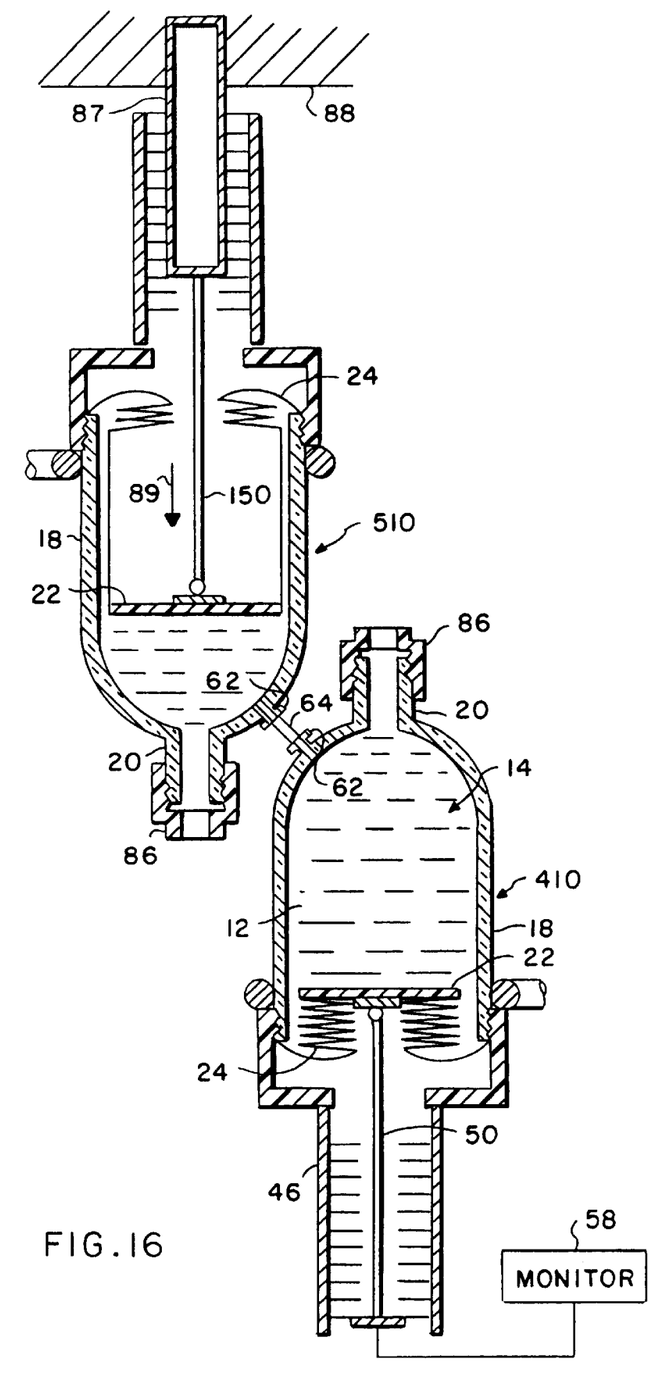

The storage tank of the present invention has numerous applications wherein fluid transfer may be employed for controlling a mechanical movement. For example, as shown in FIG. 16, a first fluid storage tank 410 constructed in accordance with the invention includes a movable base wall 22 coupled with a sensor arm 50 for controlled advancement and retraction thereof relative to a fluid-containing chamber 14 within a tank body 18. The tank 410 is shown coupled via a transfer conduit 64 connected between a pair of transfer port 62 with a second storage tank 510 for fluid transfer exchange between the two tanks 410 and 510. In this regard, FIG. 16 shows the dispense ports 20 of the two tanks 410, 510 closed by caps 86, but it will be understood that the tanks may be coupled together via the dispense ports 20 in lieu of connection via the transfer ports 62.

The movable base wall 22 within the second tank 510 (FIG. 16) carries a modified sensor arm 150 comprises a docking arm or element adapted for mechanical attachment to another body, such as a docking member 87 on a spacecraft 88 in an outer space environment. In this regard, the two tanks 410, 510 and the associated docking arm 150 would be mounted on one space vehicle to which the spacecraft 88 is to be docked. Appropriate retraction of the sensor arm 50 within the first tank 410 results in fluid transfer from the second tank 510 into the first tank 410, and a corresponding advancement of the docking arm 150 into the second tank 510 in the direction of reference arrow 89. Such displacement functions to draw the spacecraft 88 into secure docking engagement. Importantly, this docking process may procedure smoothly and under accurate control as a result of smooth fluid transfer between the storage tanks 410, 510.

A variety of further modifications and improvements in and to the improved fluid transfer system and related variable volume storage tank of the present invention will be apparent to those persons skilled in the art. Accordingly, no limitation on the invention is intended by way of the foregoing description and accompanying drawings, except as set forth in the appended claims.

What is claimed is:

1. A variable volume fluid storage tank, comprising:
   a hollow tank body having an open first end and a dispense port formed in a second end disposed generally opposite said first end;
   a base wall movably received within said open first end of said tank body, said base wall and said tank body cooperatively defining an interior chamber for receiving a selected fluid, said base wall displacing within said tank body to vary the volumetric size of said chamber in accordance with the volume of fluid within said chamber;
   means for sealingly interconnecting said base wall to said tank body, said interconnecting means including a flexible bellows annular membrane interconnecting said base wall with said tank body generally at said first end thereof; and
   a fluid level sensor unit coupled to said base wall and disposed outside said chamber, said sensor unit including means for tracking the position of said base wall relative to said tank body to indicate the fluid volume within said chamber.

2. The variable volume fluid storage tank of claim 1 wherein the fluid within said chamber is a liquid, said base wall displacing within said tank body in accordance with the volume of fluid therein substantially without any residual air or vapor space within said chamber.

3. The variable volume fluid storage tank of claim 1 further including a flow rate controller coupled to said dispense port for regulating the rate of fluid flow from said chamber through said dispense port.

4. The variable volume fluid storage tank of claim 3 wherein said flow rate controller comprises a resilient nipple having a nipple port for me d therein, and clamp valve means for constricting said nipple to set the open flow area defined by said nipple port and thereby regulate the fluid flow rate through said nipple port.

5. The variable volume fluid storage tank of claim 1 wherein said fluid level sensor unit comprises a sensor housing having a sensor arm movably mounted therein, said sensor arm having one end for engaging and tracking the position of said base wall relative to said tank body, and monitor means responsive to the position of said sensor arm for indicating the volume of fluid remaining within said chamber.

6. The variable volume fluid storage tank of claim 1 further including means for controllably and selectively advancing said base wall in a direction toward said dispense port to dispense fluid from said chamber.

7. The variable volume fluid storage tank of claim 1 further including means for retracting said base wall in a direction away from said dispense port to draw fluid into said chamber.

8. The variable volume fluid storage tank of claim 1 further including means for controllably and selectively advancing said base wall in a direction toward said dispense port to dispense fluid from said chamber, and for retracting said base wall in a direction away from said dispense port to draw fluid into said chamber.

9. The variable volume fluid storage tank of claim 1 further including at least one normally closed transfer port mounted on said tank body at a position generally adjacent to said dispense port, said at least one transfer port being adapted for connection to another fluid container for selectively transferring fluid between said chamber and said another fluid container.

10. The variable volume fluid storage tank of claim 1 further including a filter element mounted within said dispense port.

11. The variable volume fluid storage tank of claim 1 further including a pump mounted in flow communication with said dispense port for drawing fluid from said chamber through said dispense port.

12. A fluid transfer system, comprising:

a plurality of fluid storage tanks each including a hollow tank body having an open first end and a dispense port formed in a second end disposed generally opposite said first end, a base wall movably received within said open first end of said tank body and cooperating with said tank body to define an interior chamber for receiving a selected fluid, said base wall displacing within said tank body to vary the volumetric size of said chamber in accordance with the volume of fluid within said chamber, and a fluid level sensor unit coupled to said base wall and disposed outside said chamber, said sensor unit including means for tracking the position of said base wall relative to said tank body to indicate the fluid volume within said chamber; and means for interconnecting said interior chambers of said plurality of storage tanks to permit transfer of fluid therebetween.

13. The fluid transfer system of claim 12 wherein the fluid within said storage tank chambers is a liquid, said base wall of each of said storage tanks displacing within said tank body in accordance with the volume of fluid therein substantially without any residual air or vapor space within said chamber.

14. The fluid transfer system of claim 12 wherein each of said storage tanks further includes a flow rate controller coupled to said dispense port for regulating the rate of fluid flow from said chamber through said dispense port.

15. The fluid transfer system of claim 12 wherein said fluid level sensor unit of each of said storage tanks comprises a sensor housing having a sensor arm movably mounted therein, said sensor arm having one end for engaging and tracking the position of said base wall relative to said tank body, and monitor means responsive to the position of said sensor arm for indicating the volume of fluid remaining within said chamber.

16. The fluid transfer system of claim 12 wherein each of said storage tanks further includes means for controllably and selectively advancing said base wall in a direction toward said dispense port to dispense fluid from said chamber.

17. The fluid transfer system of claim 12 wherein each of said storage tanks further includes means for retracting said base wall in a direction away from said dispense port to draw fluid into said chamber.

18. The fluid transfer system of claim 12 wherein each of said storage tanks further includes means for controllably and selectively advancing said base wall in a direction toward said dispense port to dispense fluid from said chamber, and for retracting said base wall in a direction away from said dispense port to draw fluid into said chamber.

19. The fluid transfer system of claim 12 wherein each of said storage tanks further includes at least one normally closed transfer port mounted on said tank body at a position generally adjacent to said dispense port, said at least one transfer port being adapted for connection to another one of said storage tanks for selectively transferring fluid therebetween.

20. A fluid transfer system, comprising:

a plurality of fluid storage tanks each including a hollow tank body having an open first end and a dispense port formed in a second end disposed generally opposite said first end, a base wall movably received within said open first end of said tank body and cooperating with said tank body to define an interior chamber for receiving a selected fluid, said base wall displacing within said tank body to vary the volumetric size of said chamber in accordance with the volume of fluid within said chamber, and means for controllably and selectively advancing said base wall in a direction toward said dispense port to dispense fluid from said chamber, and for retracting said base wall in a direction away from said dispense port to draw fluid into said chamber; and means for interconnecting said interior chambers of said plurality of storage tanks to permit transfer of fluid therebetween.

21. The fluid transfer system of claim 20 wherein the fluid within said storage tank chambers is a liquid, said base wall of each of said storage tanks displacing within said tank body in accordance with the volume of fluid therein substantially without any residual air or vapor space within said chamber.

22. The fluid transfer system of claim 20 wherein each of said storage tanks further includes a flow rate controller coupled to said dispense port for regulating the rate of fluid flow from said chamber through said dispense port.

23. The fluid transfer system of claim 20 wherein each of said storage tanks further includes at least one normally closed transfer port mounted on said tank body at a position generally adjacent to said dispense port, said at least one transfer port being adapted for connection to another one of said storage tanks for selectively transferring fluid therebetween.

24. A fluid transfer system, comprising:

a plurality of fluid storage tanks comprising at least first and second storage tanks each including a hollow tank body having an open first end and a dispense port formed in a second end disposed generally opposite said first end, a base wall movably received within said open first end of said tank body and cooperating with said tank body to define an interior chamber for receiving a selected fluid, said base wall displacing within said tank body to vary the volumetric size of said chamber in accordance with the volume of fluid within said chamber;

said base wall of said first storage tank having an inflow port formed therein, and said second storage tank being coupled to said base wall of said first storage tank with the dispense port of said second storage tank in flow communication with said inflow port, whereby fluid from within said second storage tank is dispensed to said first storage tank for dispensing in turn via said dispense port of said first storage tank;

said second storage tank being provided in a size for nested reception within said tank body of said first storage tank as fluid is dispensed from said first and second storage tanks.

25. The fluid transfer system of claim 24 wherein the fluid within said storage tank chambers is a liquid, said base wall of each of said storage tanks displacing within said tank body in accordance with the volume of fluid therein substantially without any residual air or vapor space.

26. The fluid transfer system of claim 24 further including a fluid level sensor unit coupled to said base wall of said second storage tank and disposed outside said chamber thereof, said sensor unit including means for tracking the position of said base wall relative to said tank body to indicate the fluid volume within said chamber.

27. The fluid transfer system of claim 24 further including means for controllably and selectively advancing said base wall of said second storage tank in a direction toward said dispense port thereof to dispense fluid from said chamber, and for retracting said base wall in a direction away from said dispense port to draw fluid into said chamber.

28. The fluid transfer system of claim 24 further including a flow rate controller coupled to said dispense port of said first storage tank for regulating the rate of fluid flow from said chamber through said dispense port.

* * * * *